(12) United States Patent
Silvestre Rivero et al.

(10) Patent No.: US 11,571,889 B2
(45) Date of Patent: Feb. 7, 2023

(54) PRINTHEAD VOLTAGE REGULATORS

(71) Applicant: Hewlett-Packard Development Company, L.P., Spring, TX (US)

(72) Inventors: Ricard Silvestre Rivero, Sant Cugat del Valles (ES); Jordi Hernandez Creus, Sant Cugat del Valles (ES); Oriol Sola Tapias, Sant Cugat del Valles (ES)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 0 days.

(21) Appl. No.: 17/259,573

(22) PCT Filed: Jan. 9, 2019

(86) PCT No.: PCT/US2019/012928
§ 371 (c)(1),
(2) Date: Jan. 12, 2021

(87) PCT Pub. No.: WO2020/145970
PCT Pub. Date: Jul. 16, 2020

(65) Prior Publication Data
US 2021/0323302 A1    Oct. 21, 2021

(51) Int. Cl.
  *G05F 1/56*     (2006.01)
  *B41J 2/045*    (2006.01)
  *H02M 3/155*    (2006.01)

(52) U.S. Cl.
  CPC .............. *B41J 2/0457* (2013.01); *G05F 1/56* (2013.01); *H02M 3/155* (2013.01)

(58) Field of Classification Search
  None
  See application file for complete search history.

(56) References Cited

U.S. PATENT DOCUMENTS

| | | | |
|---|---|---|---|
| 6,439,678 B1* | 8/2002 | Norton | B41J 2/0458 347/10 |
| 6,789,871 B2 | 9/2004 | Edelen et al. | |
| 7,410,231 B2 | 8/2008 | Zhao et al. | |
| 7,448,730 B2 | 11/2008 | Hirayama | |
| 8,757,778 B2* | 6/2014 | Fricke | B41J 2/04541 347/58 |
| 9,022,497 B2 | 5/2015 | Endo et al. | |
| 9,033,469 B2 | 5/2015 | Gardner et al. | |
| 9,283,750 B2 | 3/2016 | Liao et al. | |
| 9,289,974 B2 | 3/2016 | Bruno et al. | |
| 2002/0130912 A1 | 9/2002 | Beck et al. | |
| 2006/0146086 A1 | 7/2006 | Ou et al. | |
| 2017/0305150 A1 | 10/2017 | Gardner et al. | |
| 2018/0120880 A1 | 5/2018 | Lin et al. | |

* cited by examiner

*Primary Examiner* — Jeffery S Zweizig

(57) ABSTRACT

There is disclosed a method of supplying an n-channel transistor, operating as a voltage regulator, with a supply voltage and providing a control voltage to the n-channel transistor. The n-channel transistor is controlled by the control voltage to output an operating voltage of a printhead at a predetermined voltage.

12 Claims, 3 Drawing Sheets

PRINTHEAD VOLTAGE REGULATORS

BACKGROUND

Inkjet printers may be provided with printheads for firing or spitting drops of ink or other printing fluid. In thermal inkjet printheads, ink may be ejected from a nozzle for example by using a heater resistor: when an electric voltage is applied, electric current flows through the heater resistor, heats the ink and causes it to eject from the nozzle. The printer may be a latex printer in which the printer ink may include latex or a latex polymer.

BRIEF DESCRIPTION OF DRAWINGS

Examples will now be described, by way of non-limiting example, with reference to the accompanying drawings, in which.

DETAILED DESCRIPTION

Thermal ink jet printer printheads may be supplied by three different power supplies; an operating voltage (e.g. VPP), a logic voltage in a first state (e.g. a high logic voltage or a VPP logic) and a logic voltage in a second state (e.g. a digital logic voltage or a VDD logic voltage). The operating voltage and the logic voltage in the first state may be around 32V, in thermal inkjet printing, whereas the logic voltage in the second state may be around 5.25V, for example. Factors effecting a printhead drop volume and drop weight, which may affect resulting image quality, include the delivered energy to the printhead nozzle resistor. The energy delivered to the printhead is dictated by the following equation: $E=(VPP\_Logic^2/R_{nozzle})\times$pulse width. The energy delivered to the printhead may be dependent on the operating voltage and the logic voltage in the first state and therefore it is preferable to achieve a stable operating voltage and first state logic voltage. The more stable these voltages are the higher the quality of the print.

In the following examples devices and methods are disclosed for reducing image quality defects at a low cost by regulating the voltage, and correspondingly the power, delivered to the printhead. This may be achieved by minimising voltage drops in the printhead voltage to reduce printhead energy variation. Examples according to the disclosure may be used in latex printers. In latex printers, the design margins may be quite restrictive and printhead energy variations may lead to a number of different defects, such as print quality defects, thermal issues, crusting, etc.

Figure 1:
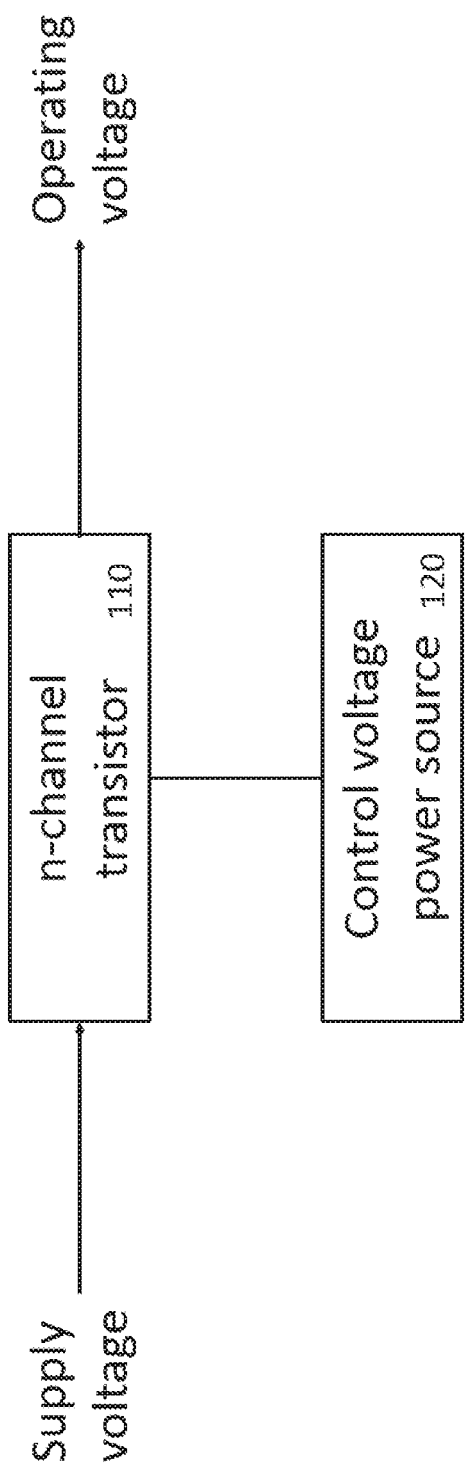
FIG. 1 is a simplified schematic of an example of device for regulating a printhead operating voltage.

Some examples, as shown in FIG. 1, may include an n-channel transistor 110, operating in regulation mode, wherein the n-channel transistor 110 is positioned to receive a supply voltage. The supply voltage may be supplied by any suitable power supply device. According to some examples there is further provided a control voltage power source 120 which provides a control voltage to the n-channel transistor 110, wherein the control voltage may control the n-channel transistor 110 to output an operating voltage of a printhead at predetermined voltage.

In some examples, the operating voltage of the printhead, output from the n-channel transistor 110, may be 32V. In which case the printhead would be programmed to operate at 32V. Further, the operating voltage, output from the n-channel transistor 110, may be slightly above 32V to take into account capable parasitics between the n-channel transistor 110 and the printhead.

In some examples, the n-channel transistor 110, operating in regulation mode, may provide that, irrespective of the voltage supplied by the supply voltage, the voltage output from the n-channel transistor 110 remains stable, enabling high quality printing to be achieved. Therefore, in accordance with the examples, regardless of variations in the supply voltage received at the n-channel transistor 110, such as a voltage drop due to cable parasitics or a voltage drop during printing, the voltage output from the n-channel transistor 110 remains stable at the predetermined output voltage.

The control voltage power source 120 may provide the control voltage to the n-channel transistor 110 at a level approximately equal to the sum of the output voltage, or the operating voltage of the printhead, and the gate-to-source voltage of the n-channel transistor 110. Any voltage drop due to cable parasitics, which may in practice be negligible, may also be taken into account. According to some examples the n-channel transistor 110 and the control voltage power source 120 may be located on the printer carriage board and the supply voltage may be the printer carriage board power supply. The printer carriage board power supply may be located separately from the printer carriage board.

Figure 2:
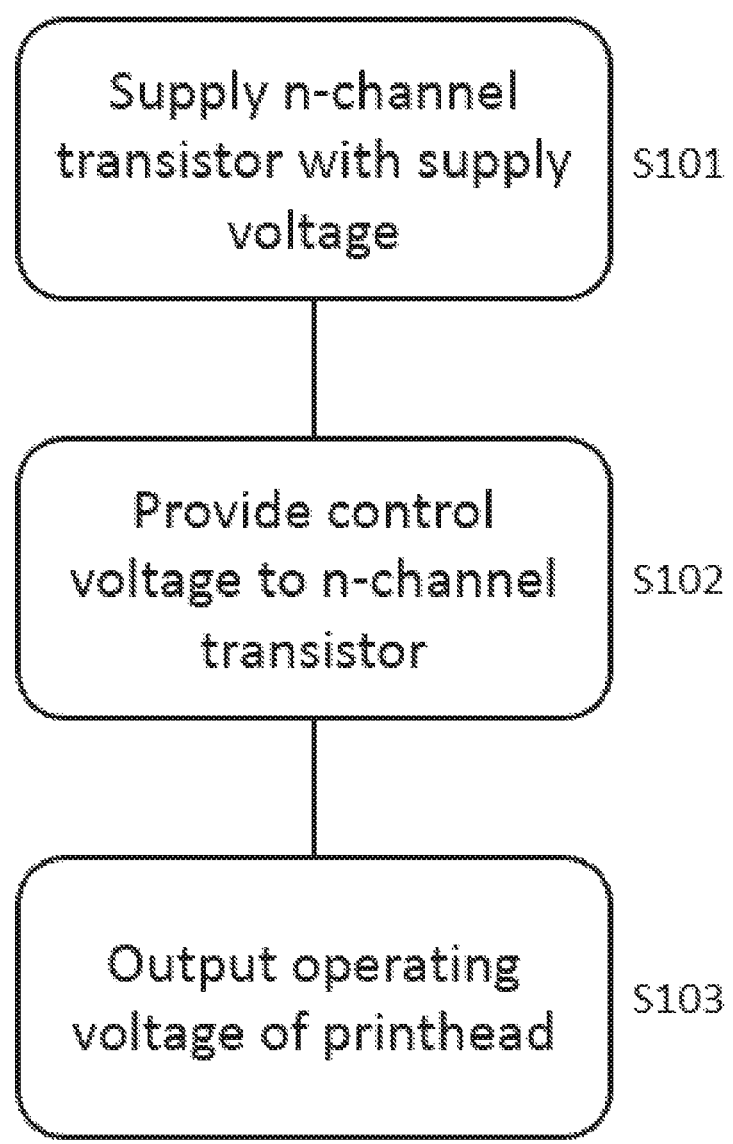
FIG. 2 is a flowchart of an example of a method of regulating a printhead operating voltage.

In some examples, as shown in FIG. 2, a method includes supplying an n-channel transistor 110 with a supply voltage S101. According to the method, the n-channel transistor 110 may be operating as a voltage regulator. The method may further include providing S102 a control voltage to the n-channel transistor 110. The control voltage may control the n-channel transistor 110 to output an operating voltage of a printhead at a predetermined voltage S103. The predetermined voltage may be the operating voltage of the printhead and an amount of voltage lost to cable parasitics.

In some examples, variations in the output voltage may be reduced or eliminated while providing a low cost circuitry which improves the prospect of high quality printing.

In some examples, the control voltage may be substantially equal to a sum of the operating voltage of the printhead and a gate-to-source voltage of the n-channel transistor 110. Setting the control voltage to an appropriate level, taking into account the gate-to-source voltage of the n-channel transistor 110 and, if appropriate, any voltage loss between the n-channel transistor 110 and the printhead reduces the possibility of variations in the voltage supplied to the printhead, thus increasing the prospect of a high quality print.

In some examples, the supply voltage is substantially equal to a sum of the operating voltage of the printhead and the voltage loss between the supply voltage source and the n-channel transistor 110. The supply voltage may be set at a voltage level to take into account losses up to the n-channel transistor 110. The supply voltage may further be set so that the voltage at the n-channel transistor 110 is equal to or slightly higher than the operating voltage of the printhead. Setting the supply voltage so that the voltage at the n-channel transistor 110 is slightly higher than the operating voltage of the printhead may allow for variation in the losses between the supply voltage source and the n-channel transistor 110.

In some examples, a switch may be provided between the supply voltage source and the printhead to enable or disable the printhead. The switch may be used to connect or disconnect power to the printhead.

In some examples, the n-channel transistor is a field effect transistor and a method according to the examples comprises providing an input voltage to a drain of an n-channel transistor, operating in a regulation mode and located on a printer carriage board. The method may further comprise providing a control voltage to a gate of the n-channel transistor, the control voltage being substantially equal to a combination of an operating voltage of the printhead and a gate-to-source voltage of the n-channel transistor. The method further comprises outputting, from a source of the n-channel transistor, the operating voltage of the printhead.

In some examples, there may be provided a device comprising an n-channel transistor, operating in a regulation mode, to receive a supply voltage. The device further comprises a control voltage source to provide a control voltage to the n-channel transistor, the control voltage controlling the n-channel transistor to output an operating voltage of a printhead at a predetermined voltage. The device may be included in a printer carriage board or may be a printer carriage board. The device may provide a reduction in the variation of the operating voltage to the printhead, leading to improved print quality. The device may further include a printhead power supply switch to enable or disable the printhead. The switch may be positioned between a supply voltage source and the printhead.

Figure 3:
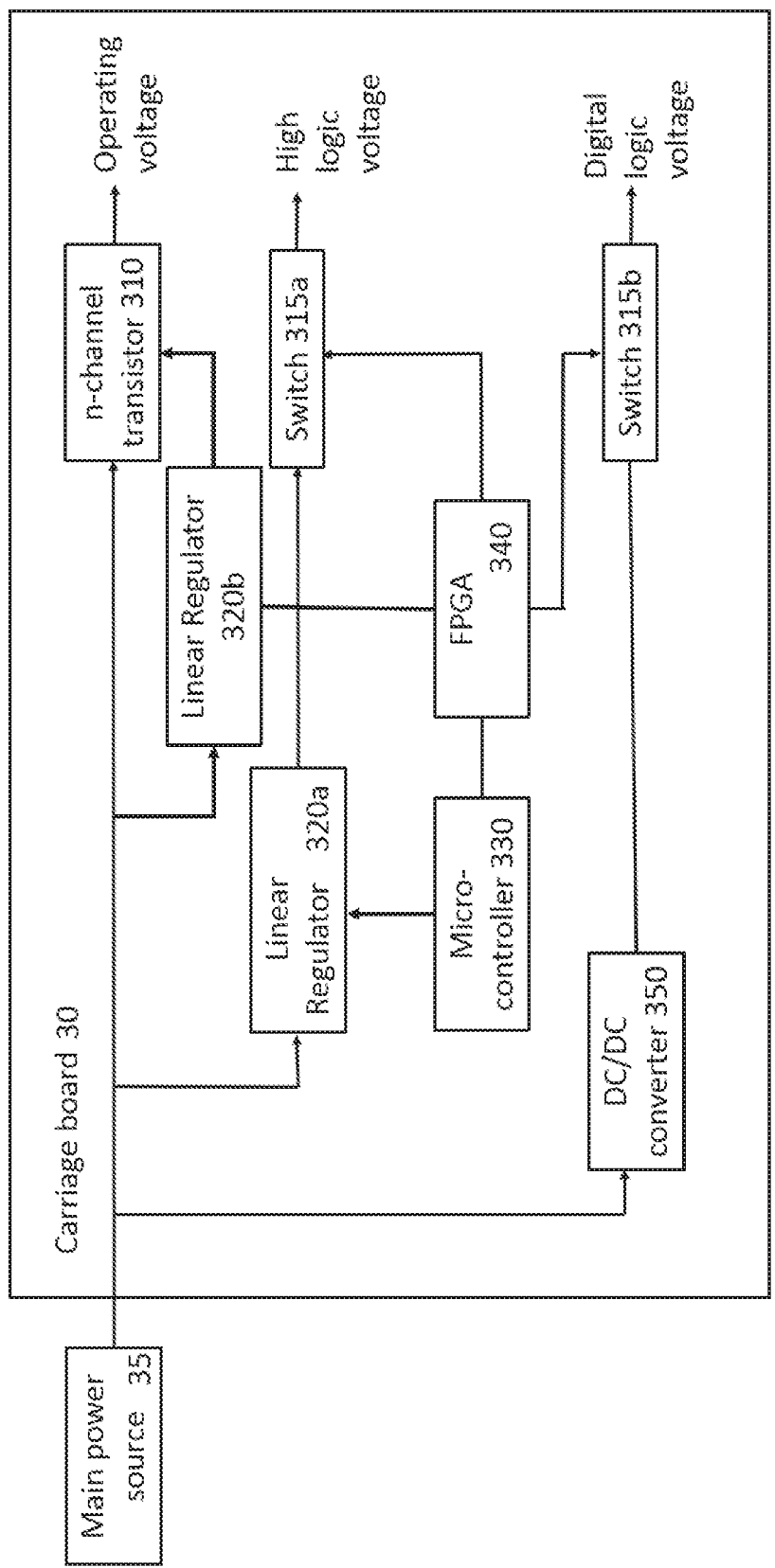
FIG. 3 is a simplified schematic of an example of device for regulating a printhead operating voltage.

In some examples, as shown in FIG. 3, a main power source 35 may output a supply voltage to a carriage board 30. The carriage board 30 may include at least one n-channel transistor(s) 310, a first switch 315a, a second switch 315b, a first linear regulator 320a, a second linear regulator 320b, a micro-controller 330, a field-programmable gate array (FPGA) 340 and a DC/DC converter 350. The carriage board 30 may receive a supply voltage from the main power source 35 and output the operating voltage, the high (first state) logic voltage, and the digital (second state) logic voltage. The output voltages may be output to at least one printhead(s).

The first linear regulator 320a may set the printhead high logic voltage. The high logic voltage may influence the energy that is delivered to a printhead nozzle, which in the case of a thermal inkjet printer may be delivered to a fire resistor. A first switch 315a may be positioned between the first linear regulator 320a and the printhead to which the high logic voltage is output. The micro-controller 330 may be a board micro-controller and may be responsible for setting the first state logic voltage to the appropriate voltage by controlling the first linear regulator 320a to output the voltage. The first linear regulator 320a may be a low-dropout regulator or similar. A micro-controller 330 may be used to allow modification of the first state logic voltage. The field-programmable gate array 340 may be used to enable or disable the printhead power supplies. The FPGA 340 is one example of a logic device. The FPGA 340 may function as a switch to enable or disable a printhead.

The DC/DC converter 350 may be positioned between the main power supply 35 and a second switch 315b. The DC/DC converter 350 may convert the main power source voltage into the digital (second state) logic voltage. The second state logic voltage may for example be a lower voltage level than the first state logic voltage.

The first linear regulator 320a may be positioned between the main power source 35 and the switch 315a for output of the first state logic voltage. The micro-controller 330 may be positioned in communication with the first linear regulator 320a and the FPGA 340. The FPGA 340 may be in communication with the micro-controller 330, the second linear regulator 320b, the first switch 315a and the second switch 315b. The first switch 315a and/or the second switch 315b may be n-channel or a p-channel transistor or any other suitable switch. The second linear regulator 320b may be positioned so as to regulate the control voltage input to the n-channel transistor 310. The FPGA 340 may be used to enable or disable the second linear regulator 320b.

In accordance with some examples, the supply voltage output by the main power source 35 may preferably be slightly greater than the operating voltage of the printhead and the voltage loss to cable parasitics combined.

Examples according to the disclosure include implementing an n-channel power transistor 310 working in regulation mode. An n-channel power transistor 310 may be controlled by the control voltage so as to feed a printhead with a voltage slightly higher than the operating voltage of the printhead. As an example the operating voltage may be 32V. For example, the supply voltage output from the main power source 35 may be 35V. This allows for 3V to be lost to cable parasitics or otherwise.

In some examples, a printer carriage circuit is connected to a voltage source (e.g. a main power source). The voltage output of this source is ideally set to the operating voltage of the printhead taking into account voltage lost due to cable parasitics. For example, if the printhead operating voltage is 32V and approximately 2.5V are lost due to cable parasitics, the voltage output of the voltage source would be set to 34.5V. However, voltage losses are not always consistent and so voltage regulation at the carriage provides one way to reduce this variability. An n-channel transistor in regulation mode may be provided at the carriage, being connected between the voltage source and the printhead. The voltage output of the transistor may be controlled by a separate voltage (e.g. a control voltage). The control voltage may be set so that the output of the transistor is at an appropriate level to control the printhead. The control voltage may be set to the operating voltage of the printhead plus the gate-to-source voltage of the n-channel transistor. Any excess voltage from the main power supply over this value will be dissipated by the transistor.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

The term 'processor' is to be interpreted broadly to include a CPU, processing unit, ASIC, logic unit, or programmable gate array etc. The methods and functional modules may all be performed by a single processor or divided amongst several processors.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   supplying an n-channel transistor, operating as a voltage regulator, with a supply voltage;
   providing a control voltage to the n-channel transistor, the control voltage controlling the n-channel transistor to output an operating voltage of a printhead at a predetermined voltage
   providing the supply voltage to a linear regulator, wherein the linear regulator is positioned to receive the supply voltage and output a regulated supply voltage;
   providing the regulated supply voltage to another n-channel transistor, the other n-channel transistor being positioned to receive the regulated supply voltage and output a first state logic voltage indicating a predetermined logic level; and
   controlling the output of the linear regulator using a microcontroller in communication with the linear regulator.

2. The method according to claim 1, wherein the control voltage is substantially equal to a sum of the operating voltage of the printhead and a gate-to-source voltage of the n-channel transistor.

3. The method according to claim 1, wherein the supply voltage is substantially equal to a sum of the operating voltage of the printhead and a voltage loss between the supply voltage source and the n-channel transistor.

4. The method according to claim 1, further comprising:
   providing a switch between a supply voltage source, of the supply voltage, and the printhead to enable or disable the printhead.

5. A method comprising:
   providing an input voltage to a drain of an n-channel transistor, operating in a regulation mode and located on a printer carriage board;
   providing a control voltage to a gate of the n-channel transistor, the control voltage being substantially equal to a combination of an operating voltage of the printhead and a gate-to-source voltage of the n-channel transistor;
   outputting, from a source of the n-channel transistor, the operating voltage of the printhead,
   providing the input voltage to a linear regulator positioned to receive the input voltage and output a regulated supply voltage to another n-channel transistor being positioned to receive the regulated supply voltage,
   providing the regulated supply voltage to the other n-channel transistor
   outputting, from the other n-channel transistor, a first state logic voltage indicating a predetermined logic level; and
   controlling the output of the linear regulator using a microcontroller in communication with the linear regulator.

6. The method according to claim 5, wherein the input voltage is provided by an input voltage source which outputs a voltage substantially equal to a sum of the operating voltage of the printhead and a voltage loss between the supply voltage source and the n-channel transistor.

7. A device comprising:
   a first n-channel transistor, operating in a regulation mode, to receive a supply voltage;
   a control voltage source to provide a control voltage to the first n-channel transistor, the control voltage controlling the first n-channel transistor to output an operating voltage of a printhead at a predetermined voltage;
   a linear regulator;
   a second n-channel transistor, wherein
   the linear regulator being positioned to receive the supply voltage and output a regulated supply voltage to the second n-channel transistor,
   the second n-channel transistor being positioned to receive the regulated supply voltage and output a first state logic voltage indicating a predetermined logic level; and
   a microcontroller, in communication with the linear regulator, to control the output of the linear regulator.

8. The device according to claim 7, further comprising:
   a printhead power supply switch to enable or disable the printhead.

9. The device according to claim 7, wherein the control voltage is substantially equal to a sum of the operating voltage of the printhead and a gate-to-source voltage of the n-channel transistor.

10. The device according to claim 7, further comprising:
    a DC/DC converter; and
    a third n-channel transistor, wherein
    the DC/DC converter is positioned to receive the supply voltage and output a converted supply voltage to the third n-channel transistor,
    the third n-channel transistor being positioned to receive the converted supply voltage and output a second state logic voltage indicating a predetermined logic level.

11. A system comprising:
    the device according to claim 7, and
    a supply voltage source to supply the supply voltage substantially equal to a sum of the operating voltage of the printhead and a voltage loss between the supply voltage source and the n-channel transistor.

12. A thermal inkjet or latex printer comprising the device according to claim 7.

* * * * *